March 8, 1955     C. S. RAIZEN     2,703,469
TOY FISH
Filed June 24, 1952
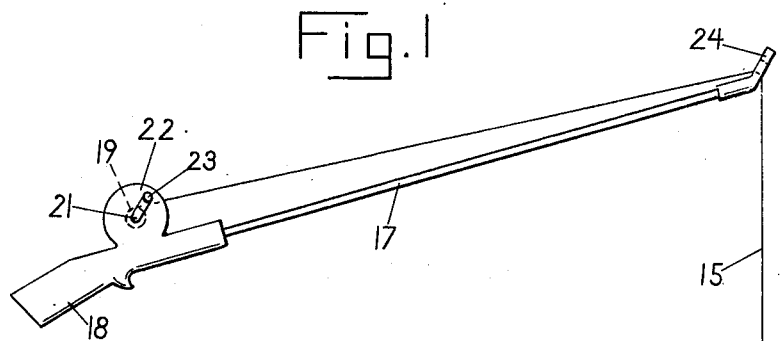
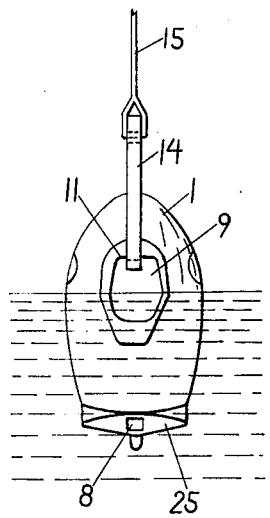
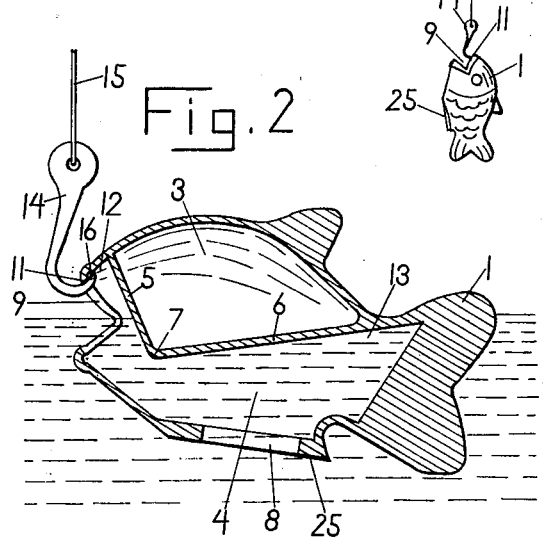
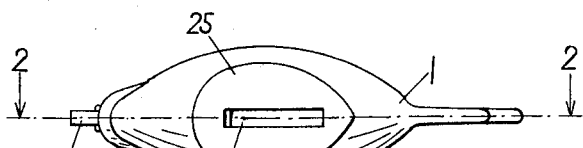
*INVENTOR:*
CHARLES S. RAIZEN
BY *Maurice Bloch*
ATTORNEY United States Patent Office 2,703,469
Patented Mar. 8, 1955

2,703,469

TOY FISH

Charles S. Raizen, New Rochelle, N. Y.

Application June 24, 1952, Serial No. 295,169

1 Claim. (Cl. 46—92)

My invention relates to toy fishing sets, and one of its objects is to catch a toy fish body in a manner similar. to the manner in which fish are hooked in true fishing.

Other objects are to provide a fish body which floats in water in a position similar to that of a fish swimming at the water surface and in a position where this body partly projects over the water surface, to provide this body with an inner chamber into which water will readily enter when the body is dropped into the water, and thereby to provided a body that will quickly and reliably assume the proper floating position.

Further objects are to provide this inner chamber with a front opening simulating the mouth of the fish, to position and shape this opening and chamber so that a fishing hook can readily engage this opening whereupon the fish body can be lifted by the hook, and thereby to make possible to catch the fish in a realistic manner.

Still other objects are to suspend the catching hook on a fishing rod or an angle by means of a line, to provide this rod with a rotatable reel on which this line can be wound, and thereby to make the catching of the fish easier, still more realistic and still more amusing.

Still further objects are to adapt the toy fish for fishing when the use of water is not possible or desirable, to provide the fish body with a flat bottom surface on which the fish can stand, for example on a table, in proper position, and to arrange this supporting surface in such a manner that it does not interfere with the optional use of the same body floating in water.

Still another object is to shape the mentioned chamber so that a quantity of air can be confined in this chamber and that this quantity can be released through the mentioned mouth opening whereby an air bubble arising from the fish mouth will amusingly simulate a fish exhalation.

Still further objects are to attain these results with simple and inexpensive means, and to make the fish of thin walls and of easily shapable material which has a specific weight not much heavier than water, for example, of plastic material.

Still other objects and advantages will appear from the following description of an exemplifying embodiment of my invention, from the appended claims and from the accompanying drawing in which:

Fig. 1 shows a side view of an illustrative embodiment of my invention in a condition in which a toy fish is being lifted by an angle.

Fig. 2 shows a cross-section of the same toy fish in floating condition, this cross-section being taken along the line 2—2 in Fig. 3, and further shows a non-sectional side view of a suspended hook in a position in which this hook engages the fish body.

Fig. 3 shows a bottom view of the fish body and hook represented in Fig. 2.

Fig. 4 shows a front view of the embodiment shown in Figs. 2 and 3.

Fig. 1 is represented on a smaller scale than Figs. 2 to 4.

Referring to the drawing, numeral 1 indicates a hollow body which has the outer shape of a fish and has an inner space divided by a partitioning wall into two chambers 3 and 4. This partitioning wall crosses the body 1 in a direction prependicular to the cross-section shown in Fig. 2 and consists of a part 5 extending from a line over the mouth of the fish obliquely down, and of a part 6 extending from a line near the rear end of the fish in slightly declining direction to the front. The wall parts 5 and 6 meet in a line 7 defining the lowest point of the chamber 3. The line 7 is positioned lower than the water surface when the body 1 floats whereby the chamber 3 has a portion extending below the water surface.

The chamber 3 is permanently closed and is empty, except for air which may be disregarded for the purposes of this invention. The chamber 4 has two openings allowing the entrance of water. An opening 8 is positioned under the water surface and preferably at the bottom of the body 1. Another opening 9 is positioned at the front of the fish body, simulates an open mouth and extends partly under, partly over the water surface whereby the mouth opening 9 has an upper rim 11 positioned over the water. A rising portion 12 of the chamber 4 is positioned in front of the wall 5 and extends at the inner side of the rim 11 higher than this rim. The main portion of the chamber 4 is lower than the chamber 3. A relatively small portion 13 of the chamber 4 is slightly higher than the line 7 and extends from this line to the rear end of the chamber 4.

Due to the described mutual position of the chambers 3 and 4, the chamber 3 is spaced from the front and from the bottom of the fish body 1. The front of the chamber portion 12 is partly formed by the mouth opening 9, partly by a thin wall of the body 1. This thin wall extends from the rim 11 upward in substantially vertical direction. Thereby, the rim 11 is adapted for being engaged and lifted with a hanging hook as will be described in the following.

The body 1 is floatable in the described position. This statement is a definition for the following structural features of this body: The weight of the body is smaller than the weight of the volume of water which equals the combined volume of the solid body parts and of the closed chamber. The weight of the body is equal to the weight of the volume of water which is replaced by the body in the shown position of equilibrium. In this position, the center of gravity of the body is situated under and in the same vertical line as the center of gravity of the replaced water volume, a part of the body is emerged while the remaining part is submerged, and a horizontal cross-section of the body extends betwen the emerged and the submerged body parts. This cross-section is positioned at a definite spot of the body determined permanently by the body's weight and shape. The described chambers facilitate the manufacture of the body of suitable material slightly heavier than water in such a manner that the body has a proper shape, the required weight, and the correct distribution of this weight.

A hook 14 is provided which is suspended on a line 15 in such a manner that the end 16 of the hook points in slightly rising direction to one side. This hook engages the rim 11 when its end 16 is introduced, by skillful movement of the line 14, into the mouth 9 in the manner illustrated by Fig. 2. Then, the hook is lifted and lifts the fish body in the manner illustrated by Fig. 1.

The line 15 is preferably a flexible thread or string. The required movements of the hook and line may be facilitated by a rod 17 from which the line hangs down. One end of the rod 17 is provided with a handle 18. A rotatable reel 19 may be carried by the handle 18. For example, the reel 19 is affixed to a shaft 21 passing rotatably through disk-shaped projections 22 of the handle 18 and being affixed to a crank 23. One end of the line 15 is affixed to the reel 19. The line may be wound about the reel as far as desired, and extends from this reel toward the free end of the rod and through an eyelet 24 affixed to this rod end.

The body 1 may be dropped into water in backward inclined position or with its tail first whereupon water will fill the entire chamber 4 as high as the outer water surface, and the released body will immediately assume the correct fishing position shown in Figs. 2 to 4. Or the body may be inserted in the water in forward inclined position or with its head first. In this case, a small quantity of air will remain in the chamber portion 13 whereby the body will assume a position in which its tail end is slightly higher than shown in these figures. The air confined in the space 13 is released through the mouth opening 9 when the tail end is temporarily depressed, for example, by fluctuation of the water level or by a slight touch of a finger tip. The released air escapes from the mouth 9 in the form of one or several bubbles which simulate the exhalation of a fish in amusing manner. The release of this air causes water to fill the space 13 whereupon the body 1 assumes the normal position shown in Figs. 2 to 4.

The body 1 is further adapted for use out of water. This is desirable when no suitable water vessel is available, or if the use of water is considered unfit for the children playing with the fishing set, or if the fluctuations of the water make the catch too hard. For this purpose, the body 1 is provided with a flat bottom surface 25 which preferably surrounds the opening 8. This surface enables the body to stand on a solid plane, for example, on a table. In the floating condition, the surface 25 may rise slightly toward the front whereby, in the standing position, the head of the fish body is slightly deeper relative to the tail than in the floating position. This does not hinder the introduction of the hook tip 16 because, out of water, the entire height of the mouth opening 9 is free for this introduction. The lower position of the rim 11 makes the engagement of this rim by the hook 14 easier.

I desire it understood that my invention is not confined to the particular embodiment shown and described, the same being merely illustrative, and that my invention may be carried out in other ways within the scope of the appended claim without departing from the spirit of my invention as it is obvious that the particular embodiment shown and described is only one of the many that may be employed to attain the objects of my invention.

Having described the nature of my invention, what I claim and desire to protect by Letters Patent is:

A toy fish comprising a body floatable in water in a position in which a part of said body is emerged while the remaining part is submerged, said body having a horizontal cross-section extending between said parts, said body having an inner space and having a partitioning wall dividing said space into two chambers, one of said chambers being closed and empty, being spaced from the front and from the bottom of said body and having a downward projecting portion extending below said cross-section, the other chamber having a portion extending under said closed chamber and having a bottom opening, said other chamber having another portion extending in front of said closed chamber and having a front opening positioned partly under said cross-section, and having still another portion positioned in the rear of the lowest part of said partitioning wall and being higher than said lowest wall part whereby air confined in said latter chamber portion will escape through said front opening only when the rear of said body tilts downward.

References Cited in the file of this patent

UNITED STATES PATENTS

| | | |
|---|---|---|
| 1,471,147 | Dienner | Oct. 16, 1923 |
| 2,391,475 | Newhardt | Dec. 25, 1945 |
| 2,525,232 | McGaughy | Oct. 10, 1950 |
| 2,598,487 | Anechiarico | May 27, 1952 |

FOREIGN PATENTS

| | | |
|---|---|---|
| 616,074 | France | Oct. 25, 1926 |